United States Patent
Park et al.

(10) Patent No.: US 9,778,456 B2
(45) Date of Patent: Oct. 3, 2017

(54) MEMS SCANNER HAVING COIL AND MANUFACTURING METHOD OF COIL FOR MEMS SCANNER

(71) Applicant: LG ELECTRONICS INC., Seoul (KR)

(72) Inventors: Joodo Park, Seoul (KR); Chihwan Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 324 days.

(21) Appl. No.: 14/674,799

(22) Filed: Mar. 31, 2015

(65) Prior Publication Data

US 2015/0277105 A1    Oct. 1, 2015

(30) Foreign Application Priority Data

Apr. 1, 2014 (KR) .................. 10-2014-0038793

(51) Int. Cl.
  *G02B 26/10* (2006.01)
  *G02B 26/08* (2006.01)

(52) U.S. Cl.
  CPC ......... *G02B 26/085* (2013.01); *G02B 26/105* (2013.01)

(58) Field of Classification Search
  CPC .... G02B 26/00–26/129; G02B 7/182–7/1828; B81B 2201/04–2201/047
  USPC .......... 359/196.1–226.3, 237–324, 838–884
  See application file for complete search history.

(56) References Cited

U.S. PATENT DOCUMENTS

| | | | |
|---|---|---|---|
| 5,920,417 A * | 7/1999 | Johnson | G02B 26/0841 235/462.33 |
| 6,188,504 B1 * | 2/2001 | Murakami | G02B 7/1821 359/224.1 |
| 7,388,700 B1 * | 6/2008 | Odhner | G02B 7/1821 359/224.1 |
| 8,203,702 B1 * | 6/2012 | Kane | G01J 3/02 356/139.05 |
| 8,752,969 B1 * | 6/2014 | Kane | G02B 7/1821 356/139.05 |
| 9,441,931 B1 * | 9/2016 | Caruso | B81B 3/0024 |
| 2001/0048784 A1 * | 12/2001 | Behin | B81B 3/0021 385/18 |
| 2002/0131682 A1 * | 9/2002 | Nasiri | G02B 26/0841 385/18 |
| 2004/0135644 A1 * | 7/2004 | Mizoguchi | G02B 26/0841 331/154 |

(Continued)

*Primary Examiner* — Bumsuk Won
*Assistant Examiner* — Jeffrey Madonna
(74) *Attorney, Agent, or Firm* — Birch, Stewart, Kolasch & Birch, LLP

(57) ABSTRACT

The present disclosure may provide a MEMS scanner including a mirror configured to reflect light, a gimbal connected to the mirror to rotatably support the mirror, and a winding portion provided at the mirror or the gimbal to generate an electromagnetic force in interaction with a magnetic field formed in the vicinity when a current flows therethrough so as to adjust a rotational angle of the mirror, wherein the winding portion includes a silicon layer, a coil layer deposited on the silicon layer to generate physical deformation due to a current flowing therethrough, and a plurality of hollow holes formed on the coil layer to provide elasticity so as to reduce an amount of impact due to the physical deformation, and increase the dissipation area of heat generated.

6 Claims, 4 Drawing Sheets

(56) References Cited

U.S. PATENT DOCUMENTS

2008/0131679 A1* 6/2008 Nakai .................... C30B 29/06
428/218

* cited by examiner

MEMS SCANNER HAVING COIL AND MANUFACTURING METHOD OF COIL FOR MEMS SCANNER

CROSS-REFERENCE TO RELATED APPLICATION

Pursuant to 35 U.S.C. §119(a), this application claims the benefit of earlier filing date and right of priority to Korean Application No. 10-2014-0038793, filed on Apr. 1, 2014, the contents of which is incorporated by reference herein in its entirety.

BACKGROUND OF THE INVENTION

1. Field of the Invention

The present disclosure relates to a MEMS scanner having an enhanced coil.

2. Description of the Related Art

Semiconductor fabrication process technologies have been widely used in various fields such as display, measurement, processing and the like. A MEMS device field among such semiconductor fabrication process technologies is used in a display field to scan incident light to a different screen region to implement an image or a scanning field to scan light and receive reflected light to provide image information. Furthermore, there is an optical scanner as a device using such technologies.

An optical scanner using a MEMS device may be fabricated in a small and thin scale using silicon mostly used in semiconductors.

In recent years, it requires the necessity of increasing a rotational angle of a mirror being driven to implement a high-resolution display using such a method. Here, a method of increasing the rotational angle of the mirror may include a method of increasing a current variation range applied to a coil.

However, a lot of heat is generated in the coil as increasing an amount of current applied thereto, and physical stresses such as shrinking, swelling, twisting, and the like may increase as increasing a movement variation range for rotating the mirror. Such heat and physical stresses may cause a reliability problem in driving an optical scanner. Accordingly, the development of an optical scanner capable of minimizing heat and physical stresses may be taken into consideration.

SUMMARY OF THE INVENTION

An object of the present disclosure is to provide a MEMS scanner capable of minimizing the reduction of mechanical performance due to heat or physical deformation generated while driving a device.

In order to accomplish the foregoing and other objectives, according to an aspect of the present disclosure, a MEMS scanner may include a mirror configured to reflect light, a gimbal connected to the mirror to rotatably support the mirror, and a winding portion provided at the mirror or the gimbal to generate an electromagnetic force in interaction with a magnetic field formed in the vicinity when a current flows therethrough so as to adjust a rotational angle of the mirror, wherein the winding portion includes a silicon layer, a coil layer deposited on the silicon layer to generate physical deformation due to a current flowing therethrough, and a plurality of hollow holes formed on the coil layer to provide elasticity so as to reduce an amount of impact due to the physical deformation, and increase the dissipation area of heat generated.

According to another aspect of the present disclosure, the winding portion may be deposited between the silicon layer and coil layer, and further include a seed layer consisting of a conductor for electroplating of the coil layer.

According to still another aspect of the present disclosure, the coil layer may include a first and a second metal portion, and the first and the second metal portion may be formed of metals with different materials.

According to yet still another aspect of the present disclosure, the winding portion may further include a protective layer formed to cover a surface of the coil layer so as to prevent the damage of the coil layer.

Furthermore, the protective layer may include a first and a second coating portion, and the first and the second coating portion may be formed of different materials.

Furthermore, the protective layer may be formed to cover an outer circumferential surface of the coil layer excluding the plurality of hollow holes.

On the other hand, in order to accomplish the foregoing task, there is proposed a coil manufacturing method of a MEMS scanner. The coil manufacturing method of a MEMS scanner may include preparing a silicon layer, placing a buffer layer that covers part of the silicon layer to form an accommodation portion for accommodating a plating solution, filling a plurality of beads into the accommodation portion, injecting a plating solution that forms a coil layer into the accommodation portion, and removing the buffer layer from the coil layer on which plating has been completed.

According to still yet another aspect of the present disclosure, said preparation step may include depositing a seed layer for electrolytic plating on a surface of the silicon layer, and the buffer layer may be disposed to cover part of the seed layer during said placement step.

According to yet still another aspect of the present disclosure, said removal step may include removing the beads of the coil layer.

According to still yet another aspect of the present disclosure, the method may further include depositing a protective layer for protecting the coil layer on a surface of the coil layer from which the buffer layer has been removed to prevent the damage of the coil layer.

The effect of a MEMS scanner having a coil and a coil manufacturing method of the MEMS scanner will be described as follows.

According to at least one of the embodiments of the present disclosure, a surface area of a coil layer may increase due to a plurality of hollow holes formed on the coil layer, thereby effectively removing heat generated due to a current applied to the coil layer.

Furthermore, according to at least one of the embodiments of the present disclosure, the coil layer may be configured to have elasticity due to a plurality of hollow holes to absorb an amount of impact due to physical deformation generated while driving the MEMS scanner, thereby enhancing reliability for the driving of the MEMS scanner.

Furthermore, according to at least one of the embodiments of the present disclosure, the coil layer may be formed to cover a surface thereof due to a first and a second coating portion, thereby preventing the coil layer from being damaged from external environments.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
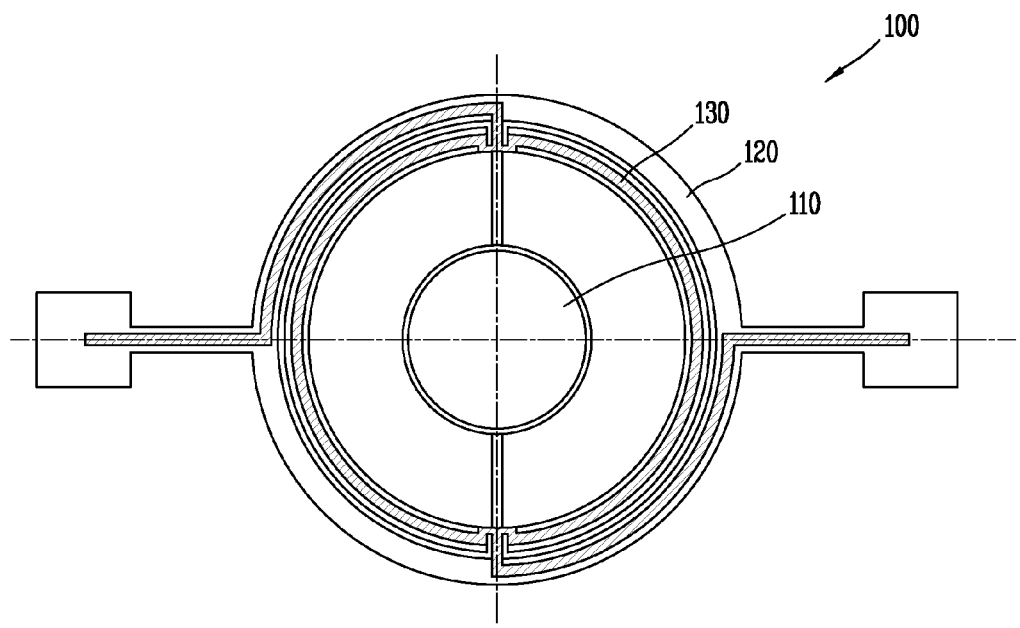
FIG. 1 is a conceptual view illustrating the inside of a MEMS scanner according to an embodiment of the present disclosure.

Hereinafter, a MEMS scanner having a coil and a coil manufacturing method of the MEMS scanner according to the present disclosure will be described in detail with reference to the accompanying drawings.

Even in different embodiments according to the present disclosure, the same or similar reference numerals are designated to the same or similar configurations, and the description thereof will be substituted by the earlier description. Unless clearly used otherwise, expressions in the singular number used in the present disclosure may include a plural meaning.

FIG. 1 is a conceptual view illustrating the inside of a MEMS scanner 100 according to an embodiment of the present disclosure. Referring to FIG. 1, the MEMS scanner 100 may include a mirror 110, a gimbal 120 and a winding portion 130.

The mirror 110 may be configured to reflect light incident from a light source. In FIG. 1, the mirror 110 is shown as a circle, but the mirror 110 may be formed in a polygon other than the circle.

The gimbal 120 is connected to the mirror 110 to rotationally support the mirror 110 so as to adjust a rotational angle of the mirror 110. Furthermore, the gimbal 120 may be configured to surround an outer circumference of the mirror 110 as illustrated in FIG. 1.

The winding portion 130 may be provided on the mirror 110 or gimbal 120. Hereinafter, a case where the winding portion 130 is provided on the gimbal 120 will be described for an example. The winding portion 130 may be disposed within the gimbal 120, and a magnetic field may be formed around the winding portion 130. For example, the magnetic field may be generated by a permanent magnet (not shown) provided at one side of the mirror 110 or gimbal 120.

Furthermore, when a current flows, the winding portion 130 may interact with the magnetic field to generate an attraction or repulsion force due to an electromagnetic force. Accordingly, the mirror 110 may relatively move with respect to the winding portion 130 by the attraction or repulsion force to adjust a rotational angle of the mirror 110. Furthermore, the intensity of a current flowing through the winding portion 130 may be formed by the controller (not shown) controlling the same.

Hereinafter, the detailed structure of the winding portion 130 will be described with reference to FIGS. 2A and 2B.

Figure 2A:
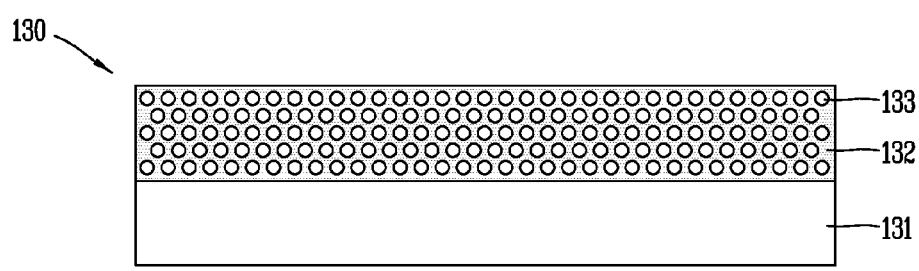
FIG. 2A is a cross-sectional view illustrating a winding portion illustrated in FIG. 1.
Figure 2B:
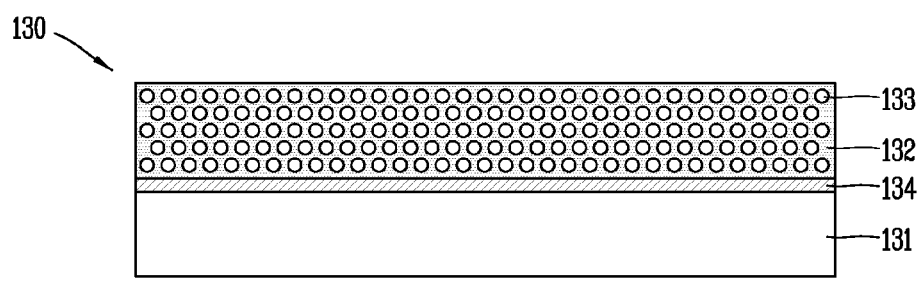
FIG. 2B is a cross-sectional view illustrating a seed layer provided in the winding portion illustrated in FIG. 2A.

FIG. 2A is a cross-sectional view illustrating a winding portion illustrated in FIG. 1, and FIG. 2B is a cross-sectional view illustrating a seed layer provided in the winding portion illustrated in FIG. 2A.

Referring to FIGS. 2A and 2B, the winding portion 130 may include a silicon layer 131, a coil layer 132 and a plurality of hollow holes 133.

The silicon layer 131 is configured to perform the role of a base of the winding portion 130 to form the winding portion 130.

The coil layer 132 may be configured with a conductor through which a current flows, and when a current applied thereto, the coil layer 132 interacts with a magnetic field to generate physical deformation such as shrinking, swelling, twisting, or the like. Accordingly, the intensity of the current may be adjusted to rotate the mirror 110, thereby adjusting a rotational angle of the mirror 110 that reflects light.

The plurality of hollow holes 133 are formed at an inner or outer side of the coil layer 132, and configured to provide elasticity to reduce an amount of impact due to the physical deformation of the coil layer 132, and extend the dissipation area of heat generated. Specifically, the coil layer 132 may have elasticity due to the plurality of hollow holes 133, and thus maintain adhesion above a predetermined size to the silicon layer 131 even when the physical deformation of the winding portion 130 is generated by a current applied thereto.

Furthermore, the plurality of hollow holes 133 may be formed to further extend a surface area of the coil layer 132, thereby effectively dissipating heat generated by the current to an outside of the coil layer 132 when increasing the intensity of a current applied to the coil layer 132 or decreasing a period in which a current is applied to the coil layer 132.

Furthermore, the plurality of hollow holes 133 is formed in a circle in FIG. 2A, but may be formed in a shape including a polygon or partial curved line other than the circle. Furthermore, each area of the plurality of hollow holes 133 or spacing distance therebetween may not be necessarily limited to the drawing of FIG. 2, and may be variously formed in any form to provide elasticity to the coil layer 132 or extend a surface area of the coil layer 132.

On the other hand, the winding portion 130 may be deposited between the silicon layer 131 and coil layer 132 as illustrated in FIG. 2B. Furthermore, the winding portion 130 may be formed with a current flowing conductor to form the coil layer 132 with electrolytic plating.

Plating is to coat a surface of a member using a metal with a specific material, and electrolytic plating due to electrolysis is typically used when the member is a metal, and a method due to electroless plating is typically used when the member is a non-metal.

According to the foregoing present disclosure, the MEMS scanner 100 is formed with a plurality of hollow holes 133 on the winding portion 130, and the coil layer 132 is formed to have elasticity due to the plurality of hollow holes 133, and configured to have an extended surface area. Accordingly, an amount of impact caused by physical deformation generated on the coil layer 132 due to a current applied to the coil layer 132 may be reduced, and heat generated due to the current may be effectively dissipated to the outside, thereby enhancing reliability for the driving of the MEMS scanner 100.

Hereinafter, a coil manufacturing method of the MEMS scanner 100 will be described in detail with reference to FIGS. 3A through 3F.

Figure 3A:
FIG. 3A is a conceptual view illustrating a configuration in which the seed layer is deposited on a silicon layer.
Figure 3B:
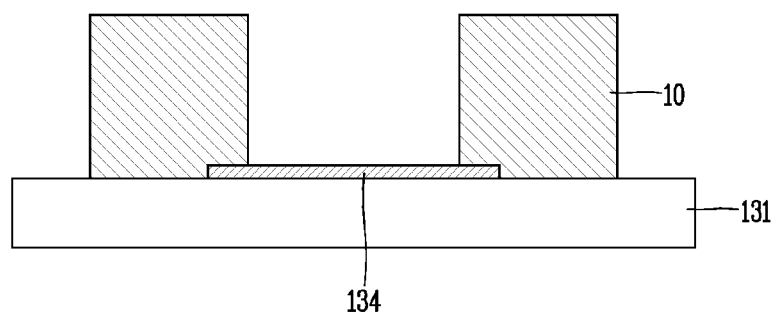
FIG. 3B is a conceptual view illustrating a configuration in which a buffer layer is disposed to cover part of the seed layer illustrated in FIG. 3A.
Figure 3C:
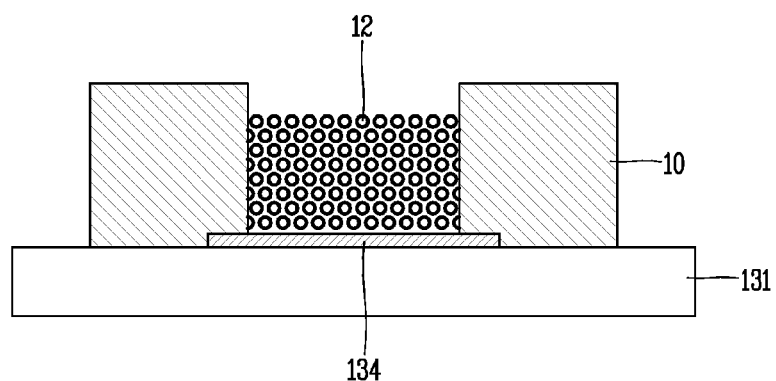
FIG. 3C is a conceptual view illustrating a configuration in which a plurality of beads are filled into an accommodation portion illustrated in FIG. 3B.
Figure 3D:
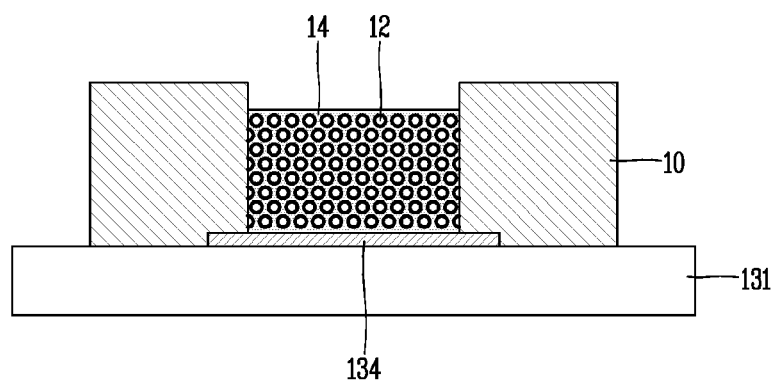
FIG. 3D is a conceptual view illustrating a configuration in which a plating solution is injected into the accommodation portion filled with beads illustrated in FIG. 3C.
Figure 3E:
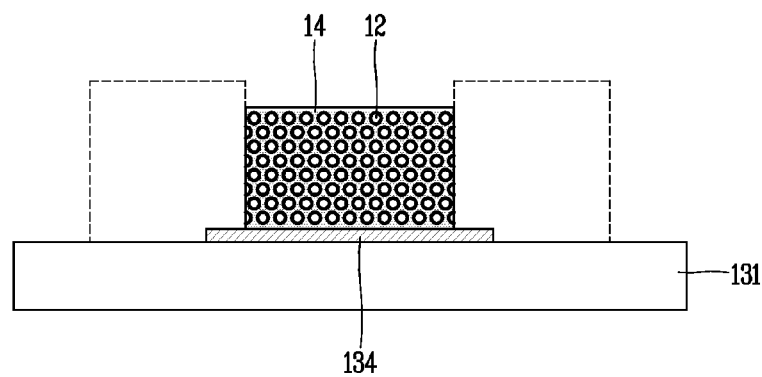
FIG. 3E is a conceptual view illustrating a configuration in which the buffer layer is removed from the coil layer illustrated in FIG. 3D.
Figure 3F:
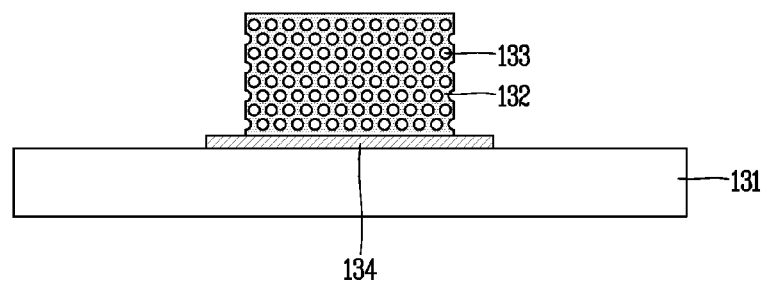
FIG. 3F is a conceptual view illustrating a configuration in which beads are removed from the coil layer illustrated in FIG. 3E.

FIG. 3A is a conceptual view illustrating a configuration in which a seed layer 134 is deposited on the silicon layer 131, and FIG. 3B is a conceptual view illustrating a configuration in which a buffer layer 10 is disposed to cover part of the seed layer 134 illustrated in FIG. 3A, and FIG. 3C is a conceptual view illustrating a configuration in which a plurality of beads 12 are filled into an accommodation portion illustrated in FIG. 3B, and FIG. 3D is a conceptual view illustrating a configuration in which a plating solution is injected into the accommodation portion filled with beads 12 illustrated in FIG. 3C, and FIG. 3E is a conceptual view illustrating a configuration in which the buffer layer 10 is removed from the coil layer 132 illustrated in FIG. 3D, and FIG. 3F is a conceptual view illustrating a configuration in which beads 12 are removed from the coil layer 132 illustrated in FIG. 3E.

Referring to FIGS. 3A through 3F, first, a coil manufacturing method of the MEMS scanner 100 may include preparing the silicon layer 131. The seed layer 134 may be deposited on the silicon layer 131 for electrolytic plating of the coil layer 132 as illustrated in FIG. 3A. Furthermore, the coil layer 132 may be formed using a method due to electrolytic plating or electroless plating.

Next, the coil manufacturing method of the MEMS scanner 100 may include placing the buffer layers 10 that cover part of the silicon layer 131 to be separated from each other to form an accommodation portion to accommodate a plating solution 14 that forms the coil layer 132 as illustrated in FIG. 3B.

Furthermore, the coil manufacturing method of the MEMS scanner 100 may include filling a plurality of beads 12 into the accommodation portion to form a plurality of hollow holes 133 on the coil layer 132 as illustrated in FIG. 3C. The plurality of beads 12 may be configured to have a cross-sectional area with a circle or a polygon other than the circle. The beads 12 may be formed of polymer-based, silica-based, metal-based, ceramic-based, magnetic-based materials or the like, for example.

Next, the coil manufacturing method of the MEMS scanner 100 may include injecting a plating solution into the accommodation portion filled with the plurality of beads 12 to form the coil layer 132 as illustrated in FIG. 3D. The plating solution 14 may be formed of gold (Au), silver (Ag), copper (Cu), chromium (Cr), platinum (Pt), nickel (Ni), aluminum (Al), tin (Sn), tungsten (W) or the like.

Next, the coil manufacturing method of the MEMS scanner 100 may include removing the buffer layer 10 from the coil layer 132 on which plating has been completed as illustrated in FIG. 3E.

Furthermore, the coil manufacturing method of the MEMS scanner 100 may include removing the beads 12 of the coil layer 132 to extend a surface area of the coil layer 132 as illustrated in FIG. 3F. For example, the removal of the beads 12 may be carried out by exposing an etchant to the plurality of beads 12.

Furthermore, the coil manufacturing method of the MEMS scanner 100 may further include depositing a protective layer for protecting the coil layer 132 on a surface of the coil layer 132 to prevent the damage of the coil layer 132. Here, the description of the protective layer will be described with reference to FIGS. 5A through 5C.

Hereinafter, another example of allowing the coil layer 232 to have a first and a second metal portion 235, 236 will be described with reference to FIG. 4.

Figure 4:
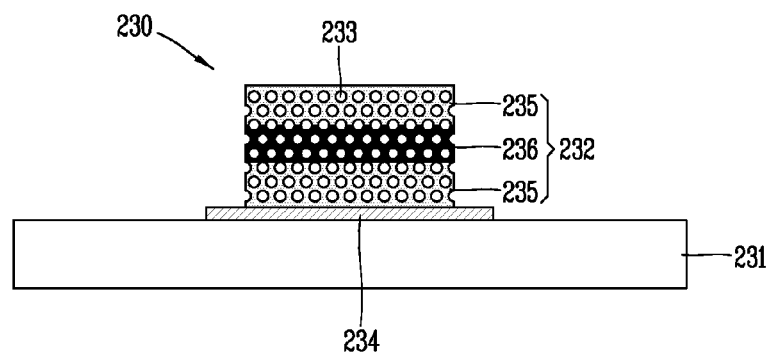
FIG. 4 is a conceptual view illustrating another example in which the coil layer of the winding portion illustrated in FIG. 1 is provided with a first and a second metal portion.

FIG. 4 is a conceptual view illustrating another example in which the coil layer 232 of the winding portion 230 illustrated in FIG. 1 is provided with a first and a second metal portion 235, 236.

Referring to FIG. 4, the coil layer 232 may include a first metal portion 235 and a second metal portion 236.

The first and the second metal portion 235, 236 may be formed of different types of materials to have a plurality of layers as illustrated in FIG. 4. For example, the first metal portion 235 may be deposited on the seed layer 234, and the second metal portion 236 made of a different type of material from that of the first metal portion 235 may be deposited on the first metal portion 235, and the first metal portion 235 may be deposited again on the first metal portion 235. Accordingly, a substance of the second metal portion 236 located at a central portion of the coil layer 232 to generate a low level of physical deformation may be placed with a material having a lower material cost than that of the first metal portion 235, thereby reducing cost for the formation of the coil layer 232.

Hereinafter, a protective layer 337, 437, 537 formed to cover a surface of the coil layer 332, 432, 532 will be described with reference to FIGS. 5A through 5C.

Figure 5A:
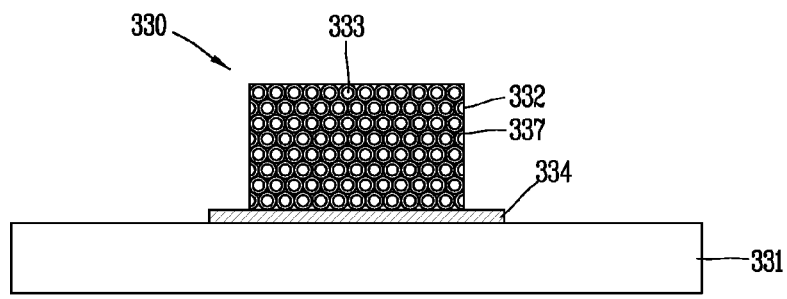
FIGS. 5A through 5C are conceptual views illustrating other examples in which a protective layer is provided on the winding portion illustrated in FIG. 1.
Figure 5B:
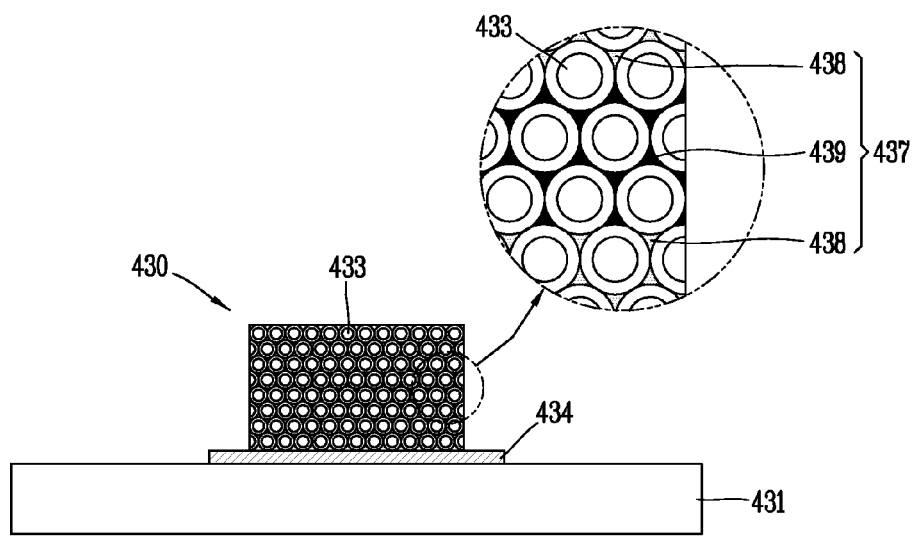
Figure 5C:
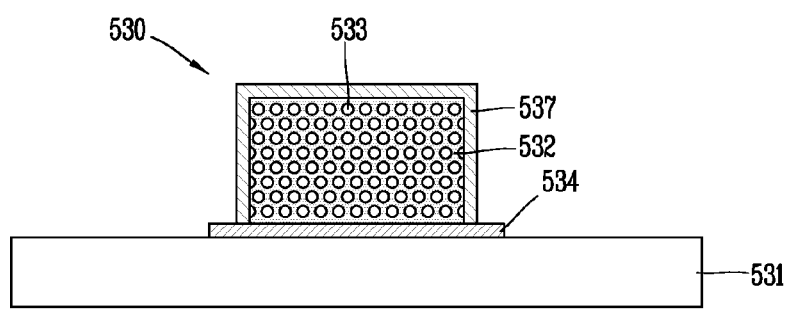

FIGS. 5A through 5C are conceptual views illustrating other examples in which a protective layer is provided on the winding portion 330, 430, 530 illustrated in FIG. 1.

Referring to FIGS. 5A through 5C, the winding portion 330 may further include a protective layer 337 formed to cover a surface of the coil layer 332 to prevent the damage of the coil layer 332 as illustrated in FIG. 5A. Accordingly, it may be possible to prevent the coil layer 332 from being damaged from external environments.

Furthermore, as illustrated in FIG. 5B, a protective layer 437 may include a first and a second coating portion 438, 439 formed in different regions from each other as illustrated in FIG. 5B. The first and the second coating portion 438, 439 may be configured to form the first coating portion 438, and form the second coating portion 439 made of a different material from that of the first coating portion 438 on the first coating portion 438, and place the first coating portion 438 again on the second coating portion 439.

Furthermore, as illustrated in FIG. 5C, a protective layer 537 may be formed to cover an outer circumferential surface of the coil layer 537 excluding an inner side of the coil layer 532, namely, excluding a plurality of hollow holes 533.

The rights scope of the present disclosure will not be limited to the configurations and methods according to the above-described embodiments, and all or part of each embodiment may be selectively combined and configured to make various modifications thereto. Furthermore, in comparison with the rights scope of the present invention obtained from the claims, it should be understood by those skilled in the art that all equivalent realizations of the present invention such as modifications, additions, deletions and substitutions are included within the rights scope of the present invention.

What is claimed is:

1. A MEMS scanner, comprising:
a mirror configured to reflect light;
a gimbal connected to the mirror to rotatably support the mirror; and
a winding portion provided at the mirror or the gimbal to generate an electromagnetic force in interaction with a magnetic field formed in the vicinity when a current flows therethrough so as to adjust a rotational angle of the mirror,
wherein the winding portion comprises:
a silicon layer;
a coil layer deposited on the silicon layer to generate physical deformation due to a current flowing therethrough; and
a plurality of hollow holes formed on the coil layer to provide elasticity so as to reduce an amount of impact due to the physical deformation, and increase the dissipation area of heat generated.

2. The MEMS scanner of claim 1, wherein the winding portion is deposited between the silicon layer and coil layer, and further comprises a seed layer consisting of a conductor for electroplating of the coil layer.

3. The MEMS scanner of claim 1, wherein the coil layer comprises a first and a second metal portion, and
the first and the second metal portion are formed of metals with different materials.

4. The MEMS scanner of claim 1, wherein the winding portion further comprises a protective layer formed to cover a surface of the coil layer so as to prevent the damage of the coil layer.

5. The MEMS scanner of claim 4, wherein the protective layer comprises a first and a second coating portion, and
the first and the second coating portion are formed of different materials.

6. The MEMS scanner of claim 4, wherein the protective layer is formed to cover an outer circumferential surface of the coil layer excluding the plurality of hollow holes.

* * * * *